(12) United States Patent
Linscott (10) Patent No.: US 8,764,399 B1
(45) Date of Patent: Jul. 1, 2014

(54) SPIRAL PLANE DRAG TURBINE

(76) Inventor: Robert W Linscott, Pittsburg, OK (US)

( * ) Notice: Subject to any disclaimer, the term of this patent is extended or adjusted under 35 U.S.C. 154(b) by 458 days.

(21) Appl. No.: 13/011,829

(22) Filed: Jan. 21, 2011

Related U.S. Application Data (60) Provisional application No. 61/330,445, filed on May 3, 2010.

(51) Int. Cl.
*F04D 29/38* (2006.01)

(52) U.S. Cl.
USPC ........................................................ 416/177

(58) Field of Classification Search
USPC ............ 415/70, 71, 72, 73, 74, 75, 76, 77, 90, 415/1; 416/177
See application file for complete search history.

(56) References Cited

U.S. PATENT DOCUMENTS

| | | | | |
|---|---|---|---|---|
| 1,058,790 A | * | 4/1913 | Pierce | 415/75 |
| 1,061,206 A | * | 5/1913 | Tesla | 415/90 |
| 3,282,825 A | * | 11/1966 | Brown et al. | 204/520 |
| 3,426,852 A | * | 2/1969 | Kinsey | 416/177 |
| 4,218,175 A | * | 8/1980 | Carpenter | 415/219.1 |
| 4,641,498 A | | 2/1987 | Markovitch et al. | |
| 4,776,752 A | | 10/1988 | Davis | |
| 5,277,542 A | | 1/1994 | Nakanishi | |
| 5,996,336 A | | 12/1999 | Hamedani | |
| 6,244,599 B1 | * | 6/2001 | Braun et al. | 277/352 |
| 7,341,424 B2 | * | 3/2008 | Dial | 415/90 |
| 7,470,105 B2 | * | 12/2008 | de Oliveira | 415/77 |
| 7,726,331 B1 | | 6/2010 | Giese | |
| 2002/0064469 A1 | * | 5/2002 | Palumbo | 417/407 |
| 2007/0092369 A1 | * | 4/2007 | Wilson | 415/90 |
| 2007/0140829 A1 | * | 6/2007 | Maillard De La Morandais | 415/4.1 |
| 2008/0093417 A1 | * | 4/2008 | Takaguchi et al. | 228/37 |

\* cited by examiner

*Primary Examiner* — Edward Look
*Assistant Examiner* — Eldon Brockman
(74) *Attorney, Agent, or Firm* — KB Patents; Luca D'Ottone (57) ABSTRACT

The present invention provides systems, devices, and methods for transferring kinetic energy from a working fluid to mechanical energy. The claimed device comprises a housing, at least one fluid inlet, a rotor assembly with a plurality of closely related blades that are positioned to create at least one spiral pathway which is continuous for the length of the rotor assembly, a shaft connected to the rotor assembly, and at least one fluid outlet. The energy is transferred when a working fluid enters the fluid inlet, flows trough the spiral pathway in the rotor assembly's direction of rotation, and exits through the fluid outlet.

1 Claim, 10 Drawing Sheets

SPIRAL PLANE DRAG TURBINE

CLAIM OF PRIORITY FROM RELATED APPLICATION

The present application claims priority from provisional application No. 61/330,445 to Robert W. Linscott filed on May 3, 2010 directed to a Spiral Plane Drag Turbine.

BACKGROUND OF THE INVENTION

The present application generally relates to systems, devices, and methods for transferring kinetic energy from a working fluid to mechanical energy. More specifically, the present invention comprises a rotor assembly having a plurality of closely related blades which form spiral pathways through which the working fluids flows. Momentum from the working fluid is transferred to the surface of the blades, turning the rotor assembly in the same direction as the direction of the fluid flow.

Turbines are generally comprised of a housing, a fluid inlet, a rotor assembly comprised of blades attached to a shaft, and a fluid outlet. As the working fluid moves past the blades of the rotor assembly, the fluid molecules immediately adjacent to the surface of the blades stick to the blades. Nearby fluid molecules collide with the molecules that are stuck to the blades, creating a boundary layer of fluids at the surface of the blades where the velocity of the fluid is reduced. The momentum from the fluid molecules in the boundary layer is transferred to the blades, which turns the rotor assembly. The working fluid then exits the housing through the fluid outlet.

Various Patent and Patent Applications deal with Rotary Turbines. For example U.S. Pat. No. 4,641,498 to Markovitch, et al. Discloses and claims a geothermal turbine for converting the energy of two-phase geothermal fluids to rotary power that includes a housing having a generally cylindrical rotor chamber with a circular manifold, and a plurality of peripheral nozzles for communicating fluid to the rotor chamber, and a rotor mounted coaxially within the chamber including a plurality of converging overlapping blades mounted around a central hub and positioned within the rotor for engagement by fluid from the nozzles.

U.S. Pat. No. 4,776,732 to Davis discloses and claims a governor device for controlling the speed of rotary devices is disclosed. The Davis device is a valve operated by centrifugal force to control a pressurized fluid through the nozzles of a turbine rotor. Under the teachings of the Davis patent said valve comprises a rotary chamber having an opening outwardly of a resilient valve member therein, the resilient valve member being movable by centrifugal force to control flow through said annular chamber, said annular chamber being part of the passageway of the pressurized fluid flow through said turbine rotor nozzles.

U.S. Pat. No. 5,996,336 to Hamedani is directed to a jet aircraft engine having an improved turbine section with curved intake manifolds to direct combustion gasses from the engine's combustion chamber into the turbine housing on a chordal flow path through the turbine generally perpendicular to the turbine rotor's axis of rotation. The Hamedani turbine rotor has a number of radially extending turbine blades for transmitting energy from the combustion gasses to shaft work to drive the engine's fan and compressor.

U.S. Pat. No. 5,277,542 to Nakanishi discloses and claims a turbine featuring a spiral partition is formed upright on the outer periphery of a rotor carried rotatably in a casing. A large number of blades are mounted between turns of the partition at a predetermined interval on the outer periphery of the rotor, and a channel for the working fluid is formed in the space between the blades and the partition on the outer periphery of the rotor. Therefore, the Nakanishi turbine is relatively efficient.

Other patents and patent applications describe various attempts to provide for a rotative turbine that can efficiently transform the kinetic energy of the working fluid into mechanical energy. Despite all the efforts listed above, prior art patents describe structures that are either not truly convenient or else involve complicated, expensive, and overly difficult to operate parts and procedures. Other devices have been advertised on various media but never patented or described into a printed publication.

SUMMARY OF THE INVENTION

A system for transferring kinetic energy from a working fluid to mechanical energy is provided. The system comprises a housing, at least one fluid inlet, a rotor assembly with a plurality of closely related blades that are positioned to create at least one spiral pathway which is continuous for the length of the rotor assembly, a shaft connected to the rotor assembly, and at least one fluid outlet. The energy is transferred when a working fluid enters the fluid inlet flows through the spiral pathway in the rotor assembly's direction of rotation, and exits through the fluid outlet.

A method is also provided for transferring kinetic energy from a working fluid to mechanical energy, the method comprising the steps of providing the system described above, injecting a stream of working fluid through the fluid inlet into the spiral pathway in the rotor assembly's direction of rotation, forming a boundary layer of working fluid between the surface of the blades, transferring momentum from the molecules of working fluid in the boudary layer to the surface of the blades, turning the rotor assembly, and allowing the working fluid to exit the housing through the fluid outlet.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The goal of the instant invention's systems, devices and methods is to transfer the kinetic energy of a working fluid to mechanical energy. More specifically, the present invention is comprised of a rotor assembly having a plurality of closely related blades which may be positioned to form a plurality of spiral pathways through which the working fluid flows. Momentum from the working fluid is transferred to the surface of each blade, turning the rotor assembly and the shaft in the same direction as the direction of fluid flow. The present invention may be easily incorporated into any number of hydraulic, pneumatic, or combustion engine designs as well as designs for hydroelectric geothermal, or solar power generation.

Figure 1:
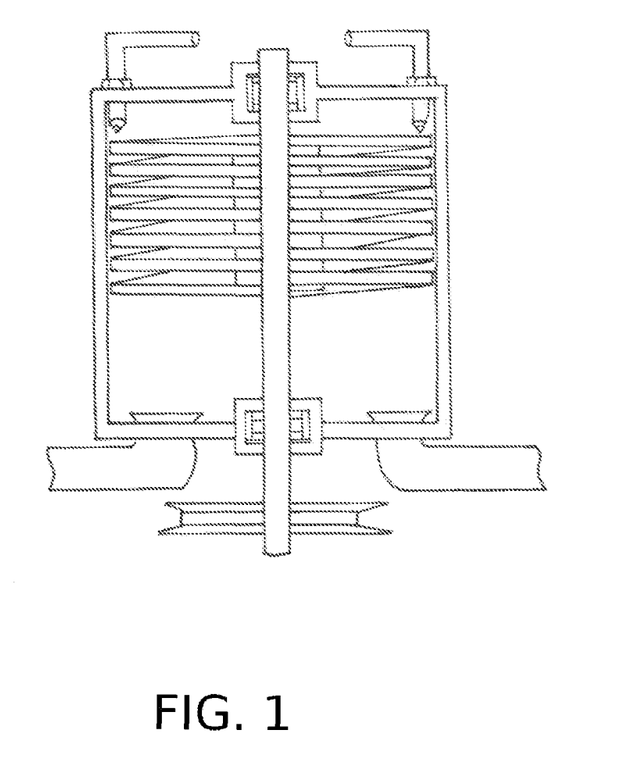
FIG. 1 shows a cross-sectional view of a turbine, including a rotor assembly, according to an embodiment of the present invention.
Figure 2A:
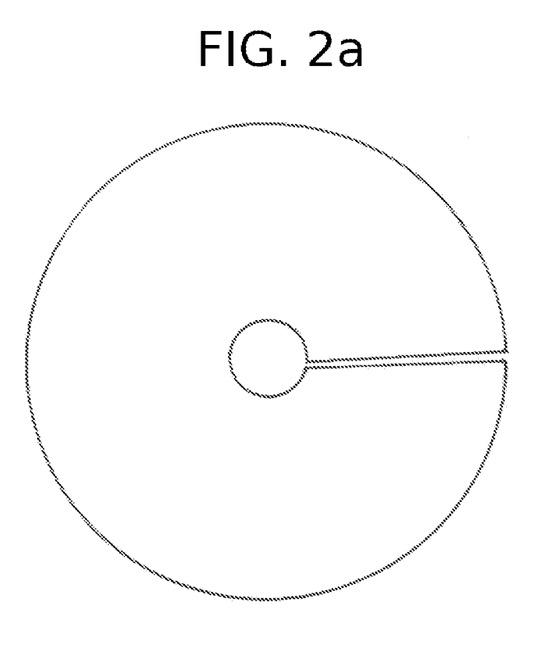
FIG. 2A and FIG. 2B show a disk with spiral blades that may be interwined onto a shaft to form spiral pathways, according to an embodiment of the present invention.
Figure 2B:
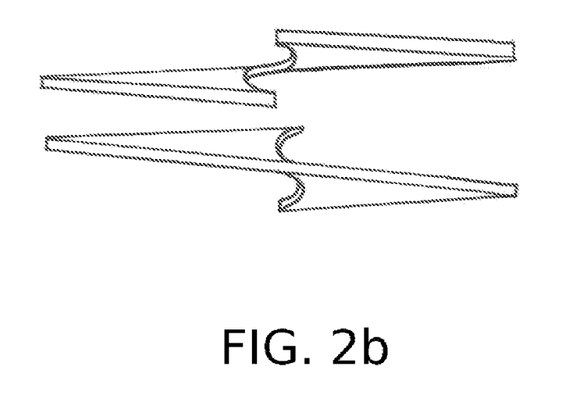
Figure 3:
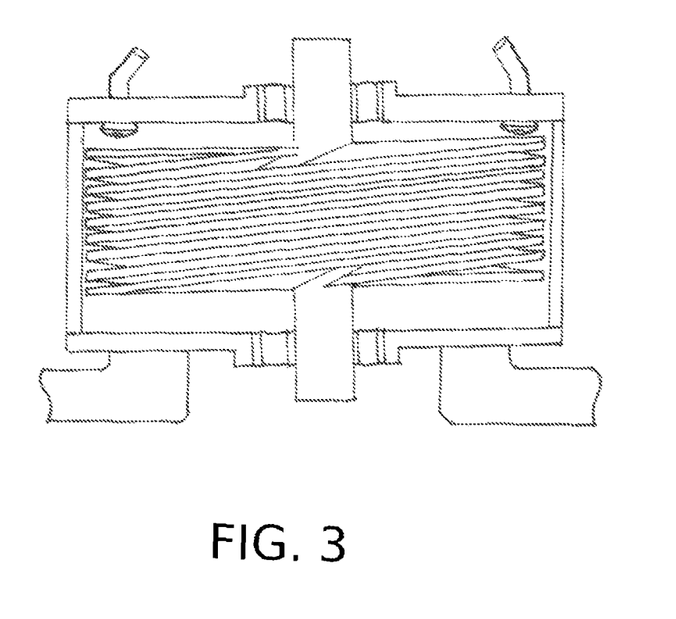
FIG. 3 shows a cross-sectional view of a rotor assembly, including spiral grooves machined into a solid cylinder to form a turbine, according to an embodiment of the present invention.

Referring to FIGS. 1-3 the present invention may be comprised of a housing, one or more fluid inlets, a rotor assembly having a plurality of closely related blades which may be positioned to form a plurality of spiral pathways, a shaft attached to the rotor assembly, and a fluid outlet. The housing may encompass the rotor assembly and may be constructed using conventional materials and methods. The rotor assembly may fit tightly within the housing in order to minimize the space between the housing and the rotor assembly. Minimizing the space between the housing and the rotor assembly may maximize the amount of working fluid that is directed into the spiral pathways.

The working fluid may be injected into the housing and then directed into the spiral pathways through one or more fluids inlets. The fluid inlet may be constructed using materials and methods that are well known in the art. Depending upon the application, fittings or other methods may be used to connect the fluid inlet to the casing. Methods of connecting the fluid inlet to the casing may include, but are not limited to threading, epoxy, or any other reasonable way.

The rotor assembly may contain a plurality of spiral pathways. The number of pathways, as well as the width of each pathway, may vary with the characteristics of the working fluid and the intended use of the turbine. The rotor assembly may be attached to a shaft so that the rotor assembly and the shaft turn as the kinetic energy from the working fluid is transformed to mechanical energy. Once the working fluid has passed through the spiral pathways, it is directed to a fluid outlet. Like the fluid inlet, the fluid outlet may be constructed using materials and methods that are well known in the art. The fluid outlet may be larger than the fluid inlet so that the fluid is able to exit the housing quickly. In addition, fluid inlets and outlets may be shaped in a number of ways, according to that witch best suits the fluid and operating requirement of each individual embodiment.

The spiral pathways may be comprised of grooves that are machined into a solid cylinder. Alternatively, the rotor assembly may be comprised of multiple smaller cylinders that are connected to the shaft and fitted together to form spiral pathways that are continuous along the entire length of the rotor assembly.

Figure 4:
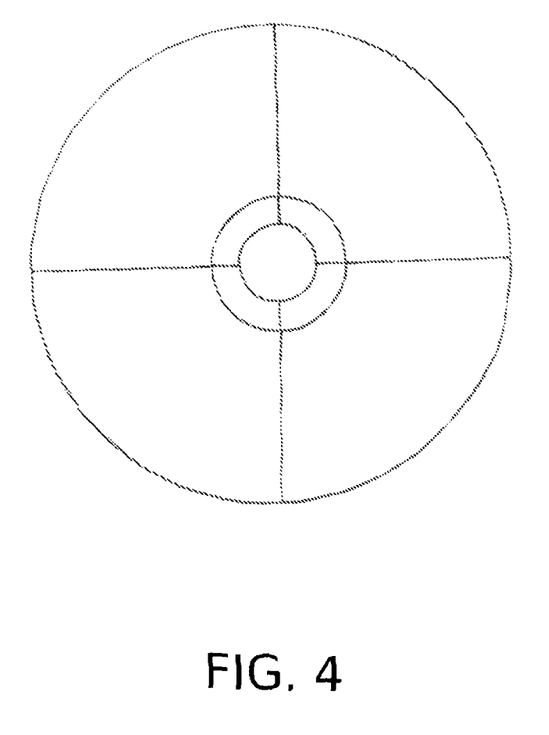
FIG. 4 shows an end view of spiral grooves machined into a solid cylinder of a turbine, according to an embodiment of the present invention.

Referring to FIG. 4, as an alternative, the rotor assembly may be comprised of a plurality of spiral shaped disks that are interwined on the shaft. The number of said spiral shaped disks which are interwined shall determine the number of pathways in the turbine. The disks may vary in thickness and may be comprised of any material that is commonly known in the art. Each disk may have one or more blades with a leading edge and a trailing edge. The leading edge of each blade may be offset from the trailing edges of the surrounding blades and overlapped to form a spiral pathway that is continuous along the entire length of the rotor assembly. The disks may also be separated by spacers, which may be formed as a part of each disk. Alternatively, the spacers may separate pieces that are placed between the disks. Depending upon the characteristics of the spacers, the spiral pathway may be smooth or stepped.

Figure 5A:
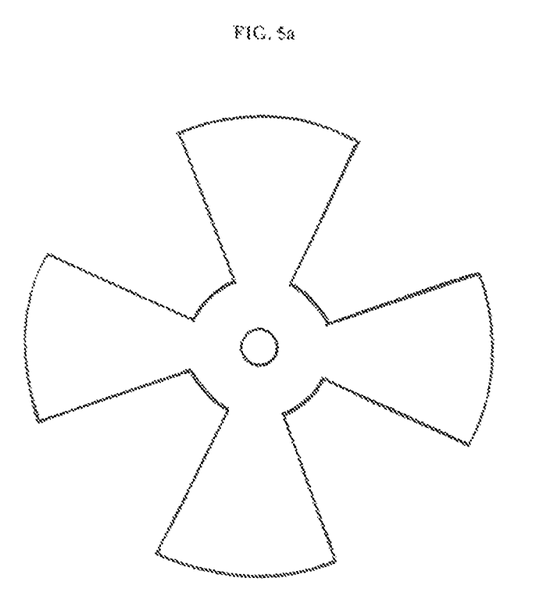
FIG. 5A and FIG. 5B show a spiral shaped disk that may be interwined with a number of identical disks onto a shaft to form spiral pathways, according to an embodiment of the present invention.
Figure 5B:
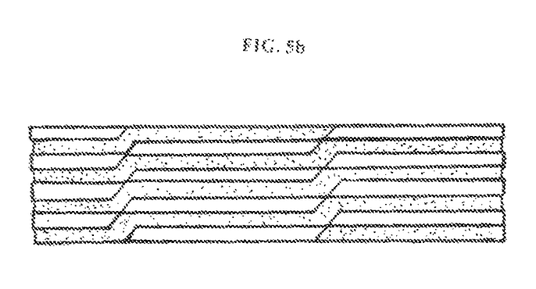
Figure 6:
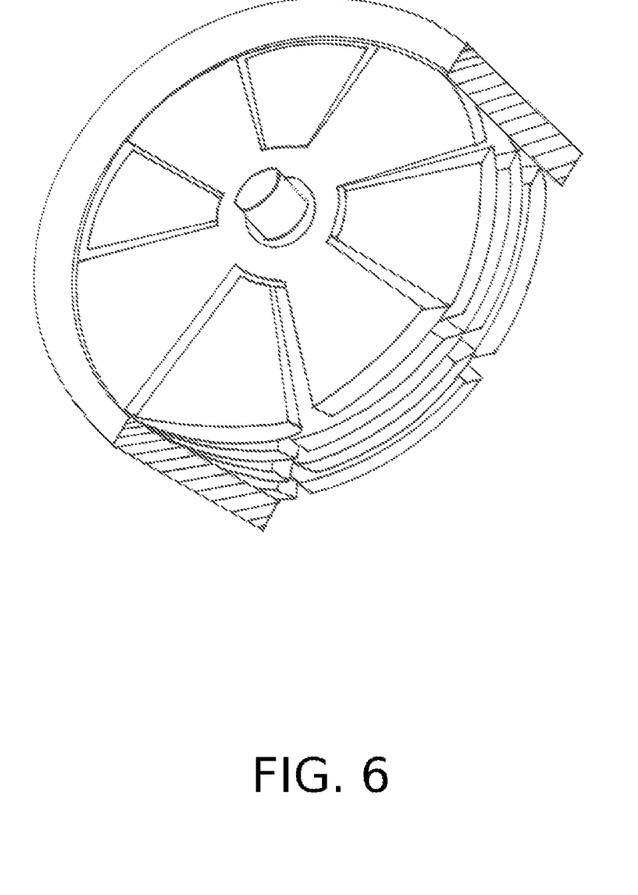
FIG. 6 shows a perspective view of spiral shaped disks that may be interwined onto a shaft to form spiral pathways, according to an embodiment of the present invention.

The number and configuration of the blades in each disk may vary, and the number of blades may determine the number of spiral pathways in the rotor assembly. In one of the preferred embodiment the blades are rotatively attached around the shaft. In a second preferred embodiment they are fixed onto the shaft. As an example FIGS. 5-6 depict an embodiment of the present invention showing that portions of the disk may be removed to create a plurality of fan-like blades. Each blade may be angled slightly so that that its leading edge can be overlapped with the trailing edges of the blades of adjacent disks to form a plurality of spiral pathways.

Figure 7A:
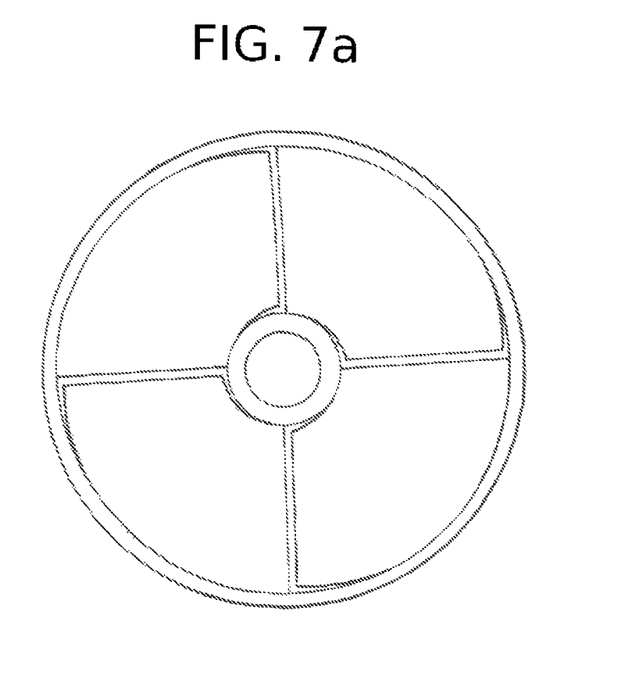
FIGS. 7A and 7b show a disk with blades that may be interwined onto a shaft to form spiral pathways, according to an embodiment of the present invention.
Figure 7B:
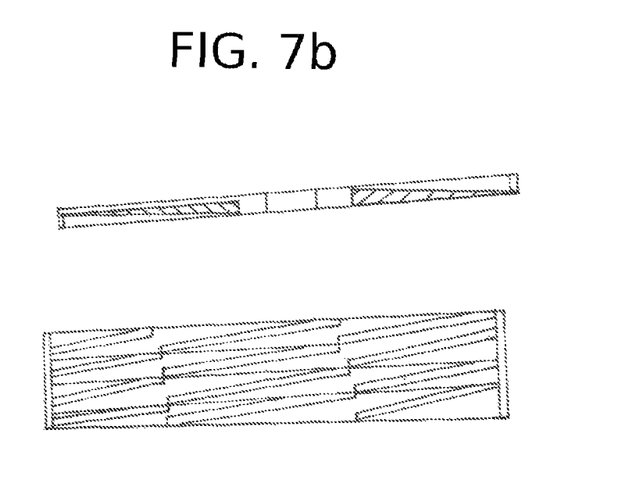

FIGS. 7a and 7b depict an embodiment of the present invention showing that narrow slices may be cut out of each disk. The resulting blades may be angled slightly so that their leading edges can be overlapped with the trailing edges of the blades of the adjacent disks, also forming a plurality of spiral pathways. FIGS. 2a and 2b depict an embodiment of the present invention showing that one narrow slice may be cut out of each disk. The resulting blade may have spiral shape so that it can be interwined with the adjacent disks to form a spiral pathway.

Figure 8:
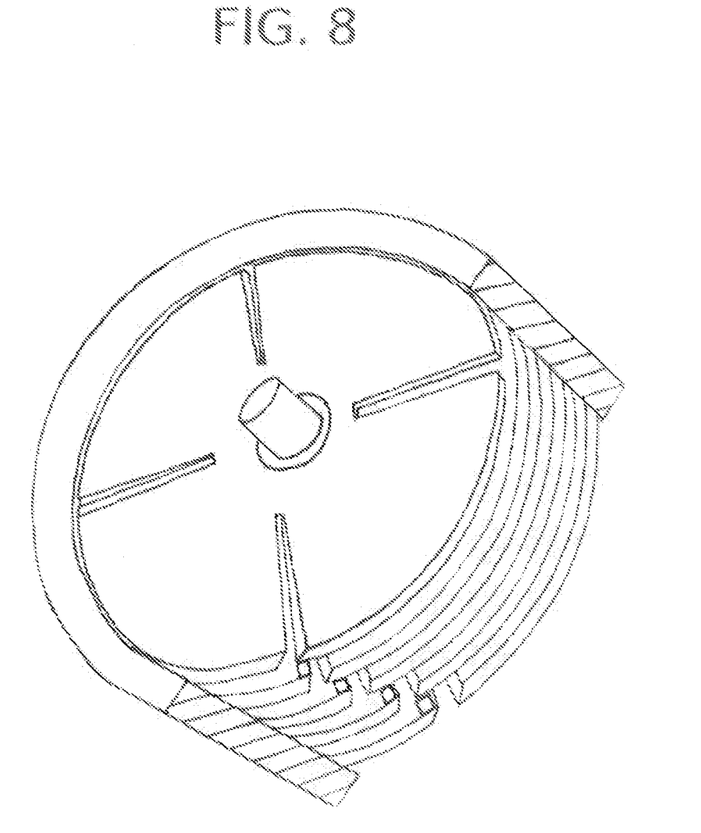
FIG. 8 shows a cross-sectional view of a turbine, including a rotor assembly, according to an embodiment of the present invention.
Figure 9:
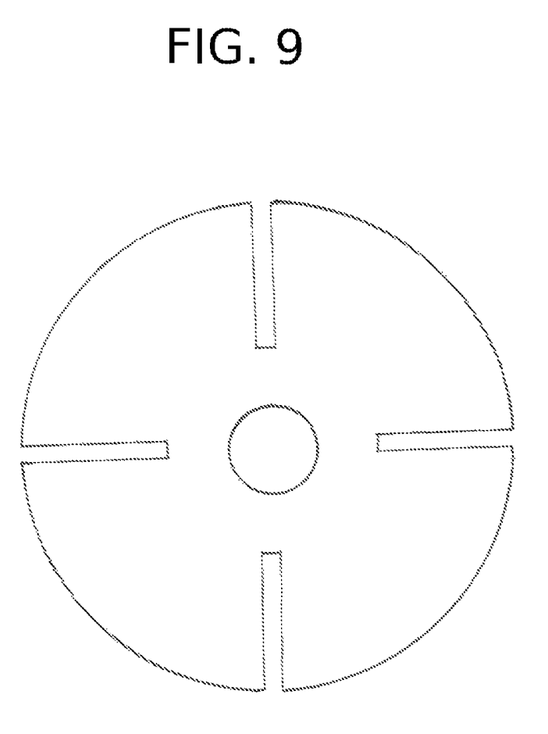
FIG. 9 shows a disk with one or more portions removed to create gaps in the disk, according to an embodiment of the present invention.
Figure 10:
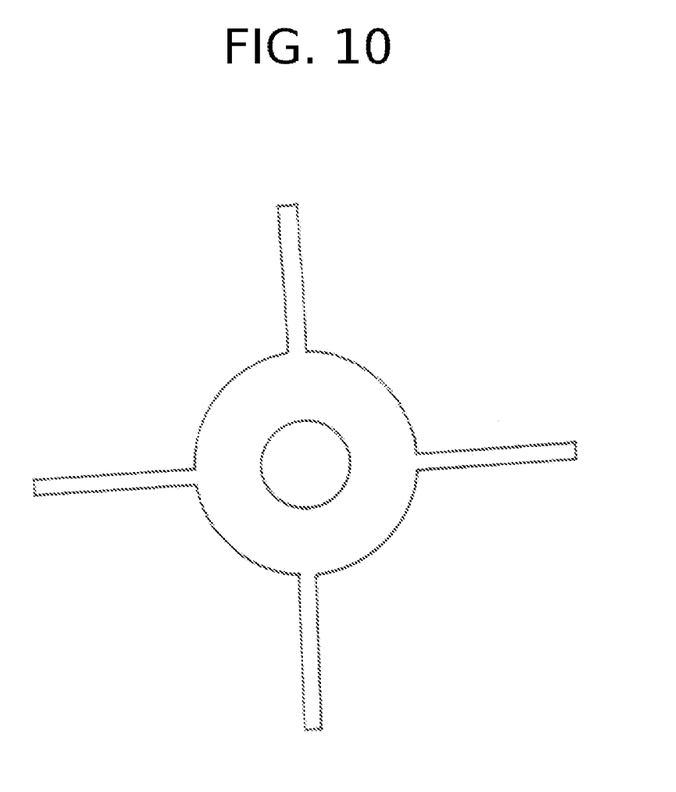
FIG. 10 shows a spacer comprised of a ring with a center hole for the shaft and a plurality of fins extending from the outer edge of the ring, according to an embodiment of the present invention.

Referring to FIG. 8, as an alternative, the rotor assembly may be comprised of a plurality of disks and a plurality of spacers. Each disk and each spacer may have a hole in the center so that the disks and spacers may be placed on the shaft. A spacer may be placed between each pair of disks, and the number of spacers may generally be one less than the number of disks. Referring to FIG. 9, each disk may have one or more portions removed to create gaps in the disk. Referring to FIG. 10, the spacer may be comprised of a ring with a center held for the shaft and a plurality of fins extending from the outer edge of the ring. The number of portions removed from the disk may equal the number of fins on the spacer, and the disks and spacers may have approximately the same circumference. When the rotor assembly is assembled, the fins of each spacer may be placed slightly behind the gaps in the disk above in order to create a spiral pathway that is continuous along the entire length of the rotor assembly. Thus, the number of gaps in the disks may determine the number of spiral pathways in the rotor assembly.

The working fluid may be, but is not limited to, air, steam, expanding gases, and water. The working fluid may be injected into the housing through the fluid inlet and directed into the spiral pathways of the rotor assembly. As the working fluid moves past the blades of the rotor assembly, the fluid molecules immediately adjacent to the surface of the blades may stick to the blades. Nearby fluid molecules may collide with the molecules that are stuck to the blades, forming a boundary layer of fluid at the surface of the blades where the velocity of the fluid is reduced. The momentum from the fluid molecules in the boundary layer may be transferred to the blades, which turns the rotor assembly. The working fluid may flow in the same direction as the rotor assembly turns, which decreases turbolence, increases the efficiency of the turbine, and reduces wear and tear on the bleades.

As it can be seen, the present invention provides a rotor assembly having a plurality of closely related blades which form spiral pathways through which the working fluid flows. The spiral pathways may be comprised of blades formed by grooves that are machined into one or more solid cylinders. Alternatively, the rotor assembly may be comprised of a plurality of closely related disks that are interwined on the shaft. The leading edges of each disk may be offset from the adjacent disks to form one or more spiral pathways that are continuous along the entire length of the rotor assembly. Momentum from the working fluid is transferred to the surface of the blades, turning the rotor assembly in the same direction as the direction of fluid flow. As a result, the present invention may reduce turbolence and increase the efficiency of the turbine. The present invention may also reduce wear on the blades, increasing the operating life of the rotor assembly, reducing maintenance and repair costs, and minimizing the amount of time the turbine is unavailable for use. Finally the rotor assembly of the present invention may be placed inside the housing of a conventional turbine making retrofits possible.

The present invention builds on the prior art improving a commonly known device: the gas turbine. The novelty of the present invention lies mainly in it's ability to yield a greater amount of work from a much smaller volume of fluid, due to the small space between the blades and the use of friction rather than deflection. When any given amount of fluid flows past a turbine blade of most current designs that fluid is only reacting on that particular blade for a fraction of one revolution and has to be redirected to react with the next witch results in a loss of momentum between each stage and an overall transfer of only a fraction of available power. More over that same volume of fluid, at best, will yield ¼ to ½ of a single rotation before being exhausted. where in my invention this same volume is forced to flow through narrow spiraling pathways with large surface areas. The close relation of these surfaces causes the boundary layers to nearly intersect, greatly increasing the transfer of fluid velocity, and the pathway extends for at least 1 full revolution before the fluid is exhausted, resulting in a much greater transfer of energy per unit of fluid volume.

In other words the spiral plane drag turbine of the instant invention features a novel rotor that in one preferred embodiment of the present invention is formed by a number of disks that have portions cut out to form blades and the cut out portions are equal in size to the remaining portions which when in a staggered fashion form spiral pathway within said very rotor. In addition to that the spiral plane drag turbine of the instant invention also features in a second preferred embodiment a spiral pathway formed by a plurality of spiral shaped disks that are interwined on the shaft, each disk shall be offset an equal amount of degrees from the previous disk and the number of disks shall determine the number of spiral pathways.

In the specific the device object of the present invention is a spiral plane drag turbine comprising a housing, a fluid inlet, a rotor assembly having a length and a direction of rotation, wherein the rotor assembly has a plurality of closely related blades which are positioned to form a spiral pathway which is continuous for the length of the rotor assembly, a shaft connected to the rotor assembly, and a fluid outlet. Wherein a working fluid enters the fluid inlet, flows trough the spiral pathway in the rotor assembly's direction of rotation, and exits through the fluid outlet. In a first preferred embodiment of the device of the present application aid spiral pathway is formed by grooves that are machined into a solid cylinder. Additionally said spiral pathway can be formed by a plurality of closely related disks that are interwined on the shaft, each disk having at least one blade with a leading edge and a trailing edge, wherein each leading edge is offset from the trailing edges of the surrounding blades and overlapped to form the spiral pathway.

The spiral pathway described above is formed by a plurality of disks with gaps and a plurality of spacers with fins, wherein the number of spacers is one less than the number of disks and the fins of each spacer are placed slightly behind the gaps on the disk above to form the spiral pathway.

When in use the main goal of the device of the present invention is to transfer energy more efficiently from the working fluid to the turbine's rotor. This is achieved by providing a housing, a fluid inlet, a rotor assembly having a length and a direction of rotation, a shaft connected to the rotor assembly, and a fluid outlet, wherein the rotor assembly has a plurality of closely related blades, each blade having a surface, the blades positioned to form at least one spiral pathway which is continuous for the length of the rotor assembly; providing a working fluid comprised of molecules with momentum; injecting the working fluid through the fluid inlet into the spiral pathway in the rotor assembly's direction of rotation; forming a boundary layer of working fluid at the surface of the blades; transferring the momentum from the molecules of the working fluid in the boundary layer to the surface of the blades; turning the rotor assembly; and allowing the working fluid to exit the housing trough the fluid outlet.

One of the advantages of the present invention over the prior art is that said transferring momentum step is done partially by friction. Friction is a physical term that indicates the action that occurs between layers within a fluid that are moving relative to each other or to another object.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spiral plane drag turbine comprising
a housing;
a fluid inlet;
a rotor assembly having a length and a direction of rotation, wherein the rotor assembly has a plurality of closely related blades which are positioned to form a spiral pathway formed by
a plurality of closely related disks that are intertwined on the shaft,
each disk having at least
one blade with
a leading edge and
a trailing edge, wherein each leading edge is offset from the trailing edges of the surrounding closely related blades which are positioned to form said spiral pathway;
a narrow slice cut out on each disk in a way that the resulting blades are angled slightly so that their leading edges can be overlapped with the trailing edges of the blades of the adjacent disks, also forming an additional plurality of spiral pathways;
wherein said rotor assembly is formed by a number of disks that have portions cut out to form blades and the cut out portions are equal in size to the remaining portions which fixed into the shaft in a staggered fashion form spiral pathway in said rotor assembly;
a shaft connected to the rotor assembly;
and
a fluid outlet,
wherein a working fluid enters the fluid inlet, flows through the spiral pathway in the rotor assembly's direction of rotation, and exits through the fluid outlet.

* * * * *